(12) United States Patent
Jungreis

(10) Patent No.: US 8,081,019 B2
(45) Date of Patent: Dec. 20, 2011

(54) VARIABLE PFC AND GRID-TIED BUS VOLTAGE CONTROL

(75) Inventor: Aaron Jungreis, Richardson, TX (US)

(73) Assignee: Flextronics AP, LLC, Broomfield, CO (US)

( * ) Notice: Subject to any disclaimer, the term of this patent is extended or adjusted under 35 U.S.C. 154(b) by 199 days.

(21) Appl. No.: 12/292,721

(22) Filed: Nov. 21, 2008

(65) Prior Publication Data

US 2010/0127737 A1    May 27, 2010

(51) Int. Cl.
*H03B 19/00* (2006.01)

(52) U.S. Cl. .......... 327/122; 327/119; 327/333; 363/34; 363/37; 363/67

(58) Field of Classification Search .................. 327/119, 327/122, 333; 363/34, 37, 67
See application file for complete search history.

(56) References Cited

U.S. PATENT DOCUMENTS

| | | | |
|---|---|---|---|
| 4,051,425 A | 9/1977 | Smith | 363/86 |
| 4,273,406 A | 6/1981 | Okagami | |
| 4,695,933 A | 9/1987 | Nguyen et al. | |
| 4,712,160 A | 12/1987 | Sato et al. | 361/388 |
| 4,788,626 A | 11/1988 | Neidig et al. | 361/386 |
| 4,841,220 A | 6/1989 | Tabisz et al. | |
| 4,857,822 A | 8/1989 | Tabisz et al. | |
| 4,866,367 A | 9/1989 | Ridley et al. | |
| 4,890,217 A | 12/1989 | Conway | |
| 4,893,227 A | 1/1990 | Gallios et al. | 363/26 |
| 4,899,256 A | 2/1990 | Sway-Tin | 361/386 |
| 4,975,821 A | 12/1990 | Lethellier | |
| 5,101,322 A | 3/1992 | Ghaem et al. | 361/386 |
| 5,164,657 A | 11/1992 | Gulczynski | 323/275 |
| 5,235,491 A | 8/1993 | Weiss | 361/694 |
| 5,262,932 A | 11/1993 | Stanley et al. | 363/26 |
| 5,295,044 A | 3/1994 | Araki et al. | 361/709 |
| 5,438,294 A | 8/1995 | Smith | |
| 5,490,052 A | 2/1996 | Yoshida et al. | |
| 5,565,761 A | 10/1996 | Hwang | 323/222 |

(Continued)

OTHER PUBLICATIONS

The Notification of Transmittal of the International Search Report and the Written Opinion of the International Searching Authority, or the Declaration; International Application No. PCT/US2009/065300, International Filing Date Nov. 20, 2009, Authorized Officer Blaine R. Copenheaver, 11 pages.

(Continued)

*Primary Examiner* — Lincoln Donovan
*Assistant Examiner* — John Poos
(74) *Attorney, Agent, or Firm* — Haverstock & Owens LLP

(57) ABSTRACT

An apparatus for generating a compensation signal for a power converter where the second harmonic ripple on the voltage bus is substantially removed from the compensation signal. The apparatus comprises a frequency-locked clock generator, a bus voltage data generator, a stack, and a compensation signal generator. The frequency-locked clock is coupled to the power converter voltage bus that contains harmonics of the AC line frequency. The clock generator frequency locks to the second harmonic of the AC line frequency and creates a system clock which is used for the synchronous operations throughout the apparatus. The bus-voltage data generator inputs a power converter scaled-bus voltage, generates bus-voltage data at a sampling rate which is determined by the coupled system clock. The output of the bus-voltage generator is input into a stack. The output of the stack is coupled to a summer to remove the second harmonic ripple, and is used by a modified PID' filter to generate a compensation signal for a power converter controller.

34 Claims, 9 Drawing Sheets

U.S. PATENT DOCUMENTS

| | | | | |
|---|---|---|---|---|
| 5,565,781 | A | 10/1996 | Dauge | 324/403 |
| 5,592,128 | A | 1/1997 | Hwang | 331/61 |
| 5,673,185 | A | 9/1997 | Albach et al. | |
| 5,712,772 | A | 1/1998 | Telefus et al. | |
| 5,742,151 | A | 4/1998 | Hwang | 323/222 |
| 5,747,977 | A | 5/1998 | Hwang | 323/284 |
| 5,786,687 | A | 7/1998 | Faulk | |
| 5,798,635 | A | 8/1998 | Hwang et al. | 323/222 |
| 5,804,950 | A | 9/1998 | Hwang et al. | 323/222 |
| 5,811,895 | A | 9/1998 | Suzuki et al. | 307/125 |
| 5,818,207 | A | 10/1998 | Hwang | 323/288 |
| 5,870,294 | A | 2/1999 | Cyr | 363/41 |
| 5,894,243 | A | 4/1999 | Hwang | 327/540 |
| 5,903,138 | A | 5/1999 | Hwang et al. | 323/266 |
| 5,905,369 | A | 5/1999 | Ishii et al. | 323/272 |
| 5,923,543 | A | 7/1999 | Choi | 363/21 |
| 6,058,026 | A | 5/2000 | Rozman | |
| 6,069,803 | A | 5/2000 | Cross | 363/21 |
| 6,091,233 | A | 7/2000 | Hwang et al. | 232/222 |
| 6,091,611 | A | 7/2000 | Lanni | |
| 6,160,725 | A | 12/2000 | Jansen | 363/65 |
| 6,272,015 | B1 | 8/2001 | Mangtani | 361/707 |
| 6,282,092 | B1 | 8/2001 | Okamoto et al. | 361/704 |
| 6,323,627 | B1 | 11/2001 | Schmiederer et al. | |
| 6,326,740 | B1 | 12/2001 | Chang et al. | |
| 6,344,980 | B1 | 2/2002 | Hwang et al. | |
| 6,366,483 | B1 | 4/2002 | Ma et al. | |
| 6,396,277 | B1 | 5/2002 | Fong et al. | 324/402 |
| 6,407,514 | B1 | 6/2002 | Glaser et al. | 315/247 |
| 6,469,914 | B1 | 10/2002 | Hwang et al. | 363/210.1 |
| 6,469,980 | B1 | 10/2002 | Takemura et al. | 369/275.3 |
| 6,483,281 | B2 | 11/2002 | Hwang | 323/299 |
| 6,487,095 | B1 | 11/2002 | Malik et al. | |
| 6,531,854 | B2 | 3/2003 | Hwang | 323/285 |
| 6,541,944 | B2 | 4/2003 | Hwang | 323/225 |
| 6,583,999 | B1 | 6/2003 | Spindler et al. | |
| 6,605,930 | B2 | 8/2003 | Hwang | 323/225 |
| 6,657,417 | B1 | 12/2003 | Hwang | 323/222 |
| 6,671,189 | B2 | 12/2003 | Jansen et al. | 363/21.14 |
| 6,674,272 | B2 | 1/2004 | Hwang | 323/284 |
| 6,958,920 | B2 | 10/2005 | Mednik et al. | 363/19 |
| 6,970,366 | B2 | 11/2005 | Apeland et al. | |
| 7,035,126 | B1 | 4/2006 | Lanni | |
| 7,038,406 | B2 | 5/2006 | Wilson | |
| 7,047,059 | B2 | 5/2006 | Avrin et al. | 600/409 |
| 7,064,497 | B1 | 6/2006 | Hsieh | |
| 7,212,420 | B2 | 5/2007 | Liao | |
| 7,286,376 | B2 | 10/2007 | Yang | |
| 7,324,354 | B2 | 1/2008 | Joshi et al. | |
| 7,450,388 | B2 | 11/2008 | Beihoff et al. | |
| 7,499,301 | B2 | 3/2009 | Zhou | |
| 7,570,497 | B2 | 8/2009 | Jacques et al. | |
| 7,639,520 | B1 * | 12/2009 | Zansky et al. | 363/65 |
| 7,764,515 | B2 | 7/2010 | Jansen et al. | |
| 2002/0011823 | A1 | 1/2002 | Lee | 320/137 |
| 2003/0035303 | A1 | 2/2003 | Balakrishnan et al. | 363/16 |
| 2004/0228153 | A1 | 11/2004 | Cao et al. | 363/71 |
| 2005/0105224 | A1 | 5/2005 | Nishi | 361/18 |
| 2005/0281425 | A1 | 12/2005 | Greuet et al. | 381/331 |
| 2006/0176719 | A1 | 8/2006 | Uruno et al. | |
| 2007/0007933 | A1 | 1/2007 | Chan et al. | |
| 2009/0231887 | A1 | 9/2009 | Ye et al. | |
| 2009/0290384 | A1 | 11/2009 | Jungreis | |
| 2009/0290385 | A1 | 11/2009 | Jungreis et al. | |

OTHER PUBLICATIONS

EE Times.com—"Team Claims Midrange Wireless Energy Transfer", by R. Colin Johnson, 4 pages, Nov. 20, 2006.

EE Times.com—"Wireless Beacon Could Recharge Consumer Devices", by R. Ciolin Johnson, 3 pages, Jan. 11, 2007.

Hang-Seok Choi et al.., Novel Zero-Voltage and Zero-Current Switching (SVZCS) Full-Bridge PWM Converter Using Coupled Output Inductor, Sep. 2002, IEEE, pp. 641-648.

"New Architectures for Radio Frequency dc/dc Power Conversion", Juan Rivas et al., Laboratory for Electromagnetic and Electronic Systems, Massachusetts Institute of Technology, Room 10-171 Cambridge, MA 02139, pp. 4074-4084, Jan. 2004.

Scollo, P. Fichera R., "Electronic Transformer for a 12V Halogen Lamp", Jan. 1999, ST Microelectronics pp. 1-4.

Bead Probe Handbook Successfully Implementing Agilent Medalist Bead Probes in Practice, "6 Test Fixturing", copyright Agilent Technologies, Inc., 2007, pp. 81-96.

SGS-Thomson Microelectronics Application Note, "An Automatic Line Voltage Switching Circuit", Vajapeyam Sukumar and Thierry Castagnet, copyright 1995 SGS-Thomson Microelectronics, Printed in Italy, 6 pages.

Notice of Allowance dated Sep. 17, 2010. U.S. Appl. No. 12/079,662, filed Mar. 27, 2008, first named inventor: Mark Telefus, 27 pages.

* cited by examiner

VARIABLE PFC AND GRID-TIED BUS VOLTAGE CONTROL

FIELD OF THE INVENTION

This invention relates to the generation of compensation signals for power converters including but not limited to power factor correction (PFC) converters and grid-tied inverters. More specifically, the present invention relates to methods of and apparatuses for generating a fast-loop response compensation signal that is substantially free of the second harmonic AC line-frequency ripple, typically 100 Hertz or 120 Hz.

BACKGROUND OF THE INVENTION

FIG. 5 is an exemplary prior art device for generating a compensation signal for a power converter. In the example shown, the compensation signal is for a power factor correction (PFC) converter. A PFC converter causes a power converter to appear as a resistive load to the network supplying power to the power converter. By having the conversion device appear as a resistive load, the power required from the network versus the power generated is optimized and thus the system is more efficient and draws less current than if the power converter presented a low-power-factor load to the network. Prior art PFC regulation loops generate a slow (typically 10 Hz-20 Hz) compensation signal for the PFC converter to prevent compensation of second harmonic ripple (e.g. 100 Hz or 120 Hz) on the output bus. Compensation of the second harmonic ripple reduces the power factor of the PFC converter, so prior art PFC regulation loops circumvent this problem by slowing down the compensation loop to the point of ignoring 100 Hz or 120 Hz ripple on the bus.

FIG. 5 illustrates a prior art circuit 500 for generating a compensation signal 536 for a PFC converter 540. A bus voltage 542 is provided to a voltage divider 520, 520' generating a scaled-bus voltage 521. The scaled-bus voltage 521 is input into an inverting input 531 of an error amplifier 533. A reference voltage source 534 provides a reference voltage to the non-inverting input 532 of the error amplifier 533. The reference voltage source 534 is typically a constant value scaled for a desired bus voltage 542. A filter compensation network 535 response time of 100 ms is typical to sufficiently remove the second harmonic ripple from the scaled-bus voltage 521 and produces an error reference signal 536 for the PFC converter controller 540.

Removal of a 100 Hz/120 Hz line ripple from the compensation signal 536 input to the PFC converter controller 540 prevents the PFC converter 541 from responding to the harmonic line ripple on the scaled-voltage bus 521. While the slow loop response allows filtering out of substantially all of the line-frequency ripple from the reference bus signal, the prior art design is not good at limiting transient voltage excursions caused upon application of a large load transient to a PFC converter 541. FIG. 6 illustrates various waveforms for a conventional prior art PFC converter system subject to a large load transient. Waveform 6A illustrates a curve of a load current as a function of time that incorporates a step in output load. The load current waveform 6A corresponds to a constant power load that is stepped up at time 400 ms and stepped down at time 600 ms. The ripple in the load current is a direct result of the variations in bus voltage and the fact that the load operates at constant power. Since PFC converters are usually connected to a second-stage converter which is a DC-to-DC converter, and the DC-to-DC converter acts as a constant power load, the curves shown in FIG. 6 correspond to a typical design situation.

The waveform 6B is a curve of AC input current into the conventional prior art PFC converter. The envelope of the AC input current rises between 400 ms and around 450 ms. After removal of the AC load at 600 ms, the AC input current drops back to pre-load levels after approximately 50 ms.

The waveform 6C is a curve of the PFC output bus voltage coupled to a conventional prior art PFC converter. At time 400 ms, at the application of the increased load, the bus voltage drops by about 50 volts between time 400 ms and 430 ms. This voltage drop can result in the undesirable side effect of causing the conventional prior art PFC convertor to drop out. The bus voltage recovers with some overshoot as shown around time 500 ms. After the increased bus load is removed (t=600 ms), the bus-voltage overshoots by around 30 volts between the time of 600 ms and 630 ms. The bus voltage is shown recovering back to the previous value at about 700 ms. Further, the negative-going voltage excursions (FIG. 6, curve 6C, 400-460 ms) causes the second-stage converter to operate over a larger voltage range, thus reducing the holdup time of the power supply immediately following a load transient as well as increasing the converter cost and lowering the overall converter efficiency. To limit the effect of the large voltage transients, large electrolytic capacitors are placed on the output of the PFC stage resulting in an increase in the cost and size for the PFC converter.

The bus-voltage transients, resulting from the load transients can cause the over-voltage protection to temporarily shut down the power supply. Another result of the uncontrolled transients, due to the slow compensated error signal response (6D in FIG. 6), is for electronic devices requiring larger voltage operating ranges in the second-stage converter (power supply).

Waveform 6D illustrates a compensation signal (536 in FIG. 5) of a prior art system configured to generate a compensation signal for a PFC converter. Because of the slow response time of the compensated error signal 536, the PFC converter 540 cannot quickly respond to the load transients (FIG. 6, curve 6A), due to the need to not respond to the line-voltage second harmonic. The compensation signal is clearly shown in FIG. 6, curve 6D. The response time of about 60 ms is required to respond to the load transient.

As a result, prior-art PFC converter designs have a number of design drawbacks. First, higher voltage rated semiconductors are required because of the voltage transients and thus the PFC converter incurs a higher manufacturing cost. Second, the second-stage converter requires larger transformers to handle the higher voltage range and thus impacts the PFC converter with lower efficiency and higher cost. Additionally, hold-up times following load transients are reduced thus causing performance issues. System design options are also limited because unregulated converter stages cannot be used in tandem with a PFC stage and thus limiting potential increased performance and cost savings.

Grid-tied inverters are another example of power converters that must regulate a DC bus while ignoring voltage variations on the bus that contain the second harmonic of the grid frequency. Grid-tied inverters, such as some photovoltaic inverters, have the same control and compensation issue as PFC converters. FIG. 9 shows a schematic representation of a typical grid-tied inverter 900. The photovoltaic array 920 or other source of power charges a high-voltage bulk capacitor 940 through a DC-to-DC converter 910 at a constant rate which is dependent on the currently available power (e.g. as a function of the level of light in the case of a photovoltaic inverter). The full-bridge inverter formed by switches (Q9-Q12) 951-954 and inductor (L6) 955 then produces a nearly sinusoidal current in phase with the grid voltage. As a result of the DC input power but sinusoidal output current, the voltage across bulk capacitor C3 contains a significant amount of second harmonic (e.g. 100/120 Hz) ripple. The inverter must adjust the amplitude of sinusoidal current that it pushes into the grid in order to regulate the voltage across bulk capacitor C3 940 to a desired level. The control loop to accomplish this regulation has exactly the same issues that have already been described for generating a PFC compensation signal.

What is needed is a circuit that produces a compensation signal representative of the bus voltage or that is substantially free of 100/120 Hz ripple but has a fast response to transients on the PFC converter (or grid-tied inverter) bus voltage.

SUMMARY OF THE INVENTION

The present invention provides an apparatus for and method of generating a compensation signal that is substantially free of power source AC line-frequency harmonic ripple. The compensation signal represents the deviation of the bus voltage from a target value that is substantially free of power source AC line-frequency harmonic ripple, and can be either a digital or analog signal. The error-signal provides a fast loop response to the bus-voltage transients. Although example embodiments are described herein primarily with digital processing of error-information, other implementations including analog filters are contemplated. Another implementation contemplated is a digital representation of the filtered bus information. This information can be scaled bus-voltage or error-voltage information. Further, a PLL can be implemented with analog or digital circuitry, the stack containing bus voltage data could be implemented with an analog charge coupled device, and likewise the compensation module filter can be implemented with analog circuitry.

One aspect of the invention is a device for generating a compensation signal for a power converter. The device is comprised of a frequency-locked system clock, a bus-voltage data generator, a stack of bus-voltage data, and a compensation module. The frequency-locked system clock has a frequency that is a multiple of an AC line-voltage frequency. The bus-voltage sampler provides bus-voltage data at the system clock frequency to the stack input. The bus-voltage data can be analog or digital and can represent bus-voltage data or error data representing the difference between the bus-voltage data and a target bus voltage. The stack has one or more outputs where voltage-bus data is output to the compensation module. The stack has a stack length which represents one or more complete cycles of the second harmonic of the AC line-frequency. The compensation module processes data from the stack forming a compensation signal output. The compensation signal is formed to minimize the frequencies at twice the power source AC line-frequency through processing stack data taken at a frequency, locked to the AC line-frequency, while providing a fast response to transients on the bus-voltage.

In one embodiment, the frequency-locked clock is a phase-locked-loop configured to selectively lock to twice the AC-line voltage frequency. The frequency-locked clock can be configured to only lock to frequencies between 64 Hz and 140 Hz.

In another embodiment the stack can have a digital or analog implementation. The analog stack comprises a charged coupled array that samples the bus-voltage data. The frequency-locked system clock is an analog device and the bus error data is analog. Comparing a scaled bus-voltage against a reference signal forms the analog bus-error data. The analog bus-error data is output to the stack.

In one embodiment, the compensation module comprises a means for summing the bus-voltage data over one-half cycle of the AC-line voltage coupled to the stack producing a summer output, a scaled proportional component and a scaled integral component coupled to the summer output having a scaled proportional output and a scaled integral output, a scaled derivative component coupled to the stack and configured to process two bus-voltage data samples separated by one-half cycle of the AC-line voltage having a scaled proportional output, and a PID summer configured to sum the scaled proportional output, the scaled integral output, and the scaled derivative output, forming a compensation signal. As with any PID controller, not all of the P, the I, and the D signals are used in every case. Different combinations of the P, I, and D signal will provide different controller loop responses. The compensation signal can further comprise a scaled feed-forward component having an input coupled to the power converter bus, having a feed-forward output coupled to the PID summer, wherein the compensation signal further comprises a scaled feed-forward signal component. The compensation module can be embodied with digital components, analog components, or a combination thereof.

In a further embodiment, the device further comprises a converter module having a converter input configured to receive the compensation signal. The converter module is configured to convert the digital compensation signal to an analog compensation signal on a converter output. The converter output is configured to interface with a power converter.

In another embodiment, the bus-voltage sampler can generate bus-voltage data or error data representing the differences between the bus-voltage value and a target voltage value. The data can be analog or digital.

In another embodiment, the device can be implemented in an ASIC (application specific integrated circuit). Some of the larger filter components of the PLL can be implemented outside of the ASIC. Further, the ASIC can include the power converter controller as part of the device.

In another aspect of the invention discloses a method for generating a compensation signal for a power converter that is substantially free of AC power source harmonics, specifically the second harmonic. A method comprises the steps: generating a frequency-locked system clock having a frequency that is locked to an integral multiple of an AC-line voltage frequency, generating bus-voltage data at the frequency, queuing the bus-voltage data, and compensating the bus-voltage data thus forming a compensating signal wherein the compensation minimizes the compensation signal frequency components that are at even multiples of the AC-line voltage frequency. The frequency-locked system clock is generated at a multiple of the bus-voltage line frequency. The bus-voltage data can be generated at a scaled multiple of the system clock rate. The bus-voltage data is queued in a stack at the system clock rate. The stack output can be configured to output data in any manner but preferably is configured to output the most recent and the oldest bus-voltage data. Preferably, the stack length is selected to hold bus-voltage data representing one-half an AC line cycle, but the stack length can instead be selected to hold bus-voltage data representing an integral number of half-cycles. In another step, the method includes compensating the bus-voltage data and forming a compensation signal.

In one embodiment, the method of generating a frequency-locked clock is a phase-locked-loop configured to selectively lock to twice the AC-line voltage frequency. The method of generating a frequency-locked clock can be configured to only lock to frequencies within 64 Hz to 140 Hz.

In another embodiment the queuing can be digital or analog. The queuing can be implemented with a stack comprised of a charged coupled array that samples the bus-voltage data. Further, generating the voltage-bus data can be analog or digital and either provides sample data or error data.

In one embodiment, the compensating includes a compensation module comprising a means for summing the bus-voltage data over one-half cycle of the AC-line voltage frequency coupled to the stack producing a summer output, a scaled proportional component and a scaled integral component coupled to the summer output having a scaled proportional output and a scaled integral output, a scaled derivative component coupled to the stack and configured to process two bus-voltage data samples separated by one-half cycle of the AC-line voltage having a scaled proportional output, and a PID summer configured to sum the scaled proportional output, the scaled integral output, and the scaled derivative output, forming a compensation signal. As with any PID controller, not all of the P, the I, and the D signals are used in every case. The compensation signal can further comprise a scaled feed-forward component having an input coupled to the power converter bus, having a feed-forward output coupled to the PID summer, wherein the compensation signal further comprises a scaled feed-forward signal component. The compensation module can be embodied with digital components or with analog components.

In a further embodiment, the device further comprises a converter module having a converter input configured to receive the compensation signal. The converter module is configured to convert the digital compensation signal to an analog compensation signal on a converter output. The converter output is configured to interface with a power converter controller.

In another embodiment, the generating bus-voltage data can generate bus-voltage data or error data representing the differences between the bus-voltage value and a target voltage value. The data can be analog or digital.

In one embodiment, some, all, or a combination of the steps can be performed with analog components and techniques. The frequency-locked system clock can be analog and the bus-error data can be analog. The stack of bus-error data can be an analog charge coupled device where the delay line length is one or more cycles of the bus-voltage ripple. The analog filtering can form a scaled derivative component and a scaled proportional component of the bus-error data as components of the target-voltage compensation signal. In a further embodiment, the filter includes a scaled integral component of the bus-error data as part of the target-voltage compensation signal. In a further embodiment, a scaled feed-forward component is added to the target-voltage compensation signal.

A third aspect of an invention discloses method of manufacturing a device for generating a compensation signal for a power converter. The method comprises the steps of providing a frequency-locked clock coupled to an AC-line having an AC-line voltage frequency, wherein the clock is configured to generate a frequency that is frequency locked to an integral multiple of the AC-line voltage frequency, providing a bus-voltage sampler coupled to the frequency-locked clock and coupled to a power converter bus having a bus-voltage and generating bus-voltage data at the frequency, providing a stack coupled to the bus-voltage sampler, wherein the stack is sized to contain bus data-samples spanning a time interval of one-half cycle of the AC-line voltage, and providing a compensation module, operatively coupled to the stack, and configured to generate from the bus-voltage data a compensation signal, and wherein the compensation signal module is configured to produce a compensation signal in which the frequency components at even multiples of AC-line voltage frequency are minimized.

In one embodiment, the provided frequency-locked clock is a phase-locked-loop configured to selectively lock to twice the AC-line voltage frequency. The provided frequency-locked clock can be configured to only lock to frequencies within 64 Hz to 140 Hz.

In another embodiment, providing the stack can be with digital or analog components. The stack can be an implemented with a charged coupled array that samples the bus-voltage data. Further, the generating the voltage-bus data can be analog or digital and either provide sample data or error data.

In one embodiment, the providing the compensating module comprises a means for summing the bus-voltage data over one-half cycle of the AC-line voltage coupled to the stack producing a summer output, a scaled proportional component and a scaled integral component coupled to the summer output having a scaled proportional output and a scaled integral output, a scaled derivative component coupled to the stack and configured to process two bus-voltage data samples separated by one-half cycle of the AC-line voltage having a scaled proportional output, and a PID summer configured to sum the scaled proportional output, the scaled integral output, and the scaled derivative output, forming a compensation signal. As with any PID controller, not all of the P, the I, and the D signals are used in every case. The compensation signal can further comprise a scaled feed-forward component having an input coupled to the power converter bus, having a feed-forward output coupled to the PID summer, wherein the compensation signal further comprises a scaled feed-forward signal component. The compensation module can be embodied with digital components or with analog components.

In a further embodiment, the method further comprises providing a converter module having a converter input configured to receive the compensation signal. The converter module is configured to convert the digital compensation signal to an analog compensation signal on a converter output. The converter output is configured to interface with a power converter.

In another embodiment, the providing a bus-voltage sampler data can generate bus-voltage data or error data representing the differences between the bus-voltage value and a target voltage value. The data can be analog or digital.

In one embodiment, some, all, or a combination of the steps can be performed with analog components and techniques. The frequency-locked system clock can be analog and the bus-error data can be analog. The stack of bus-error data can be an analog charge coupled array where the delay line length is one or more cycles of the bus-voltage ripple. The analog filtering can form a scaled derivative component and a scaled proportional component of the bus-error data as components of the target-voltage compensation signal. In a further embodiment, the filter includes a scaled integral component of the bus-error data as part of the target-voltage compensations signal. In a further embodiment, a scaled feed-forward component is added to the target-voltage compensation signal.

These and other aspects, features and advantages of the invention are understood with reference to the drawing figures and detailed description herein, and are realized by means of the various elements and combinations particularly pointed out in the appended claims. It is understood that both the foregoing general description and the following brief description of the drawings and detailed description of the invention are exemplary and explanatory of preferred embodiments of the invention, and are not restrictive of the invention, as claimed.

DETAILED DESCRIPTION OF THE PRESENT INVENTION

Figure 1:
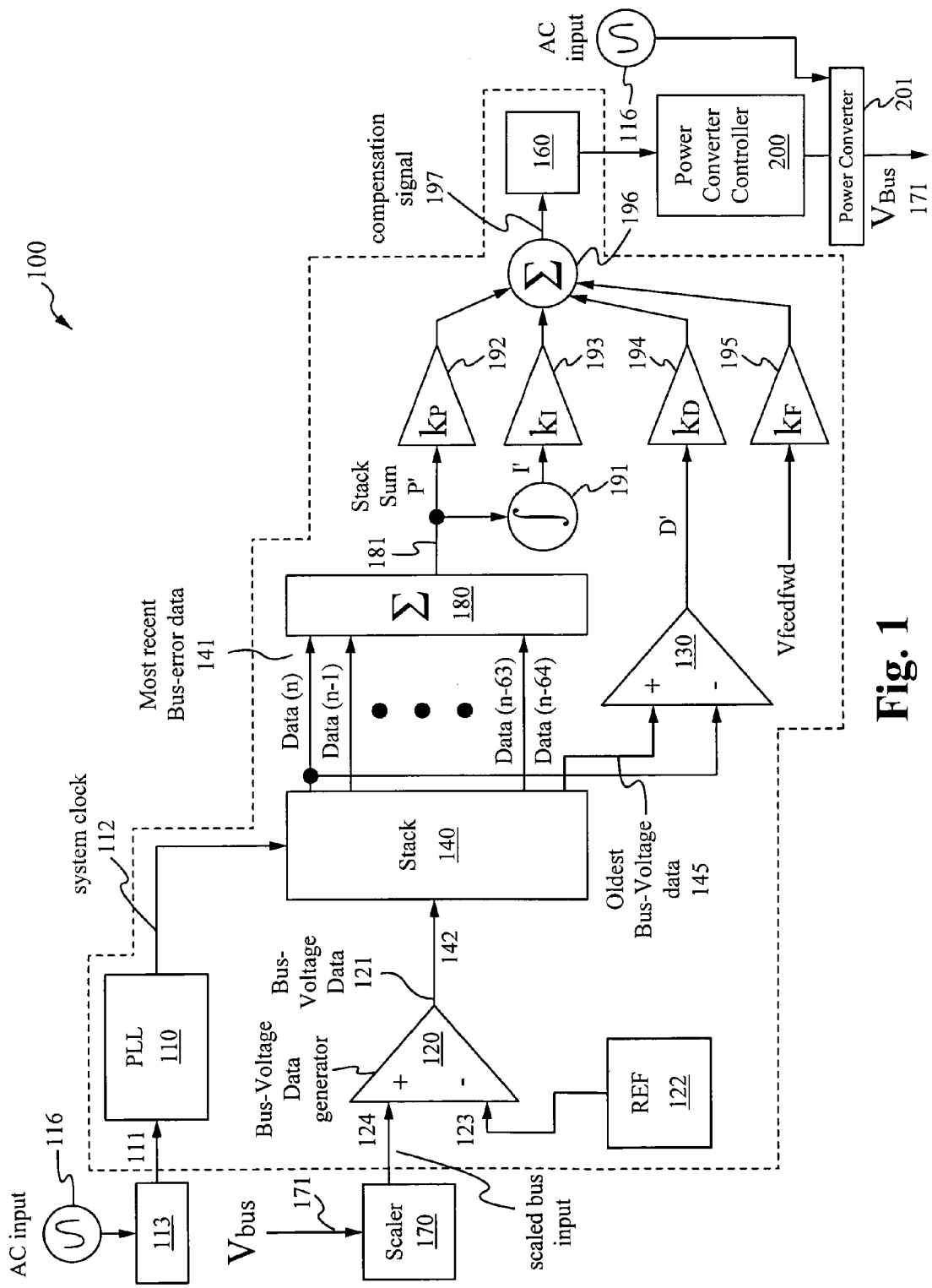
FIG. 1 illustrates a block diagram of a circuit for generating a fast loop response compensation signal for a power converter that is substantially free of second harmonic AC line-frequency ripple, according to one embodiment of the invention.

Certain embodiments of the present invention are directed to an apparatus and method for generating a fast-loop compensation signal for a power converter, including but not limited to a PFC converter or grid-tied inverter. The compensation signal is designed to have a fast response to changes in the power converter's load but not respond to the second harmonic of the AC power source frequency, typically 100/120 Hz. The following description of the invention is provided as an enabling teaching of the invention that includes its best, currently known embodiment. One skilled in the relevant art will recognize that many changes can be made to the embodiment described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present inventions are possible and may even be desirable in certain circumstances, and are a part of the present invention. Thus, the following description is provided as illustrative of the principles of the present invention and not in limitation thereof, since the scope of the present invention is defined by the claims.

The following description uses a generic power converter for illustration; however, all of the principles described apply equally to generating a compensation signal for but not limited to a PFC converter or a grid-tied inverter.

In the preferred embodiment of the invention, a PLL provides a frequency-locked clock to the second harmonic of the power converter's AC power source, typically 100 Hz or 120 Hz. The PLL provides a clock that is frequency-locked to the rectified AC power source line-frequency or at an integral multiple of the AC power source line-frequency. The frequency-locked clock, or an integral multiple or integral fraction, or combination thereof of the frequency-locked system clock is distributed to other circuit modules. A bus-voltage sampler provides information about the bus-voltage. Preferably, the bus-voltage sampler provides bus-voltage data representing error values proportional to the difference between the bus voltage value and a target value; however, bus-voltage data can instead represent samples of the bus-voltage values rather than error values. The stack contains bus-voltage data which has been sampled over a period equal to an integral multiple of one half of the AC-line cycle.

The PID' signal is generated by summing three values either through analog or digital methods. The modified proportional (P') signal is a scaled value of the stack sum. The modified integral (I') signal is an integrated value of the stack sum scaled by a second value. The modified derivative (D') signal is the difference between the oldest stack bus-voltage error data and the current bus-voltage data scaled by a third value. The three scaling values are chosen to produce a fast but stable compensation loop based on techniques commonly practiced by those skilled in the art of power supply design. The P', the I', and the D' signals are substantially free of second-harmonic line frequency content. The P' signal was already shown to contain no second-harmonic line frequency content because the stack contains equally spaced bus-voltage data representing exactly one line-frequency half-cycle due to the frequency locked clock. The I' signal is an integral of the P' signal, so it too is substantially free any second-harmonic line frequency content. The D' signal is the difference between two samples (oldest stack sample and current error) which are spaced apart in time by exactly one-half line cycle. In the case of steady-state converter operation, the oldest and newest bus-voltage error data are identical so the D' signal is zero, thus substantially free of second-harmonic line frequency content. The resulting PID' controller therefore ignores 100/120 Hz harmonics but responds in a controlled manner to transients on the bus voltage. The digital PID' target-voltage compensation signal can be directly coupled to a digital input on a digitally implemented PFC converter control, or can be converted into an analog signal and used with an analog PFC converter control.

FIG. 1 illustrates a block diagram 100 of one embodiment of a system for generating a fast loop response compensation signal 197 for a power converter controller 200. The system comprises a second-harmonic line frequency detector 113, a phase-locked loop (PLL) 110, a bus-voltage sampler or data generator 120, a stack 140, a modified derivative data D' generator 130, a voltage scaler 170, a summer 180, a proportional data scaler 192, an integrator 191, and integrator data scaler 193, a derivative scaler 194, a feed-forward scaler 195, a compensation signal component summer 196, and an optional signal converter 160.

The second-harmonic line frequency detector 113 can be any means known in the art to produce a strong signal component at twice the frequency of the AC line input. In practice, the second-harmonic line frequency detector 113 will typically be created by comparing a full-wave rectified AC line voltage to a fixed reference level; however, there are many other methods to produce pulses at a frequency equal to the second-harmonic of the input line frequency. The PLL 110 is one means for producing a frequency-locked clock but other means are contemplated. The PLL 110 locks to the second harmonic of the AC-line frequency, typically at 100 Hz or 120 Hz, and generates a phase-locked system clock 112 which is a multiple of the second-harmonic line frequency. The frequency multiplication is accomplished by placing a frequency divider in the feedback path of the PLL 110. So, for example, if the frequency divider divides the frequency by a factor of 64 and the AC line frequency is 50 Hz, then the second-harmonic line frequency detector will produces pulses at a rate of 100 Hz and the PLL 110 will produce a frequency-locked system clock at a frequency of 6.4 kHz. One could obtain the same result by having the PLL 110 lock to the AC line frequency (rather than the second harmonic of the line frequency) and then multiply the input frequency by an additional factor of two. The PLL 110 can be analog, digital, or a combination of both. Integrated ASIC version of a PLL 110 can be used. Some of the analog filter components can be too large to economically implement in an ASIC and thus kept external from a PLL ASIC design.

The frequency-locked system clock output 112 is coupled to the system components that require synchronization with the frequency-locked system clock which includes the stack 140, and in practice will also include all elements of the system which are implemented digitally.

The voltage scaler 170, typically a voltage divider composed of resistors, scales the bus voltage 171 to produce scaled bus input 124 which is input into a bus-voltage data generator 120. The purpose of the scaler 170 is to lower the bus-voltage data samples to a level compatible with the other electronics. The bus voltage 171 can be hundreds of volts.

The bus-voltage sampler 120 can generate data in a number of different forms. The bus-voltage data output 121 can be digital or analog. Further, the bus-voltage data can represent a scaled bus-voltage or a scaled error value from a target voltage. As shown in FIG. 1, an error signal is generated representing the difference between a scaled bus voltage 124 and a reference signal generator 122. A reference voltage 122 is coupled to the alternative input 123 into bus-voltage sampler 120. The reference voltage 123 and the scaled bus voltage 124 are selected such that the difference, i.e. the error, is zero when the bus voltage 171 is at a target level. In operation, the bus voltage and thus the scaled-bus voltage input 124 has 100/120 Hz ripple on the signal and thus the difference between the reference voltage 122 and the scaled bus voltage 124 will reflect this ripple. In a configuration where bus-voltage samples are generated, instead of error bus-voltage samples, then other electronics in the summer 180, stack 140, or in other electronics (not shown) can subtract out the DC bias in the data; however, it is advantageous to use error samples rather than bus-voltage samples in order to reduce the required dynamic range of the computational hardware. It is apparent to one skilled in the art that by changing the reference voltage 122, or the scaling factor in the voltage scaler 170, that different target bus voltages 171 can be selected. A typical value for voltage reference 122 is approximately 2.5 volts or 1.25 volts. The bus-voltage sampler 120 provides bus-voltage data 121 to the stack 140.

The bus-voltage data 121 is input into the stack 140 on the input 142. A frequency locked system-clock 112 is provided to the stack 140 from the PLL 110 to control the rate and location at which bus-voltage data is input, output, and stored in the stack 140. The stack 140 is sized to hold samples representing a time interval of one-half cycle of an AC-line voltage. Multiples of this stack size are also contemplated by this disclosure. Preferably, the stack is digital and receives digital bus-voltage data but an analog implementation is also contemplated. An analog version of the stack 140 can be implemented with chain of charged coupled devices called a charge coupled array. Samples of bus-voltage data are stored as voltage charges within the charged coupled array.

The summer 180 averages the bus-voltage data 121 from the stack 140 over one-half cycle of the AC-line equivalent to one cycle of the second harmonic of the AC-line. Because the bus-voltage data 121 is frequency locked to the second harmonic of the AC-line frequency, the sum of the second harmonic components will average substantially to zero when the converter has a constant load. Noise and resolution limitations will typically provide some residual data at the second harmonic. The sum 180 can be calculated by either an analog means or a digital means. If the bus-voltage data 121 does not represent error values, then preferably DC offset is subtracted from each bus-voltage data 121 sample. Preferable, the sum is calculated by keeping a running sum of the samples by subtracting the oldest sample and adding the newest sample.

In the embodiment shown, the stack 140 provides an output for the latest value, Error(n), and the error value Error(n−64) delayed by one-half cycle of the AC line or a full cycle of the AC-line second harmonic. The derivative generator 130 generates a difference value D' which can be analog or digital. The bus-voltage data samples on the oldest bus-voltage data output 145 are delayed by the stack length that is shown as 64 bus-voltage data samples. The stack length is sized to cover a half-cycle of the AC line or a full cycle of the AC-line second-harmonic ripple. Thus, by choosing a stack depth that is locked to the time of one cycle of the second harmonic ripple, the differential signal component D' is free of the AC second harmonic. This illustrates a relationship between the system clock 112 and the stack depth. A doubling of the system clock 112 will require a doubling of the stack depth.

An implementation of a compensation signal generator utilizing a modified PID' filter is illustrated in FIG. 1. The embodiment shown comprises a modified PID' (proportional, integral, derivative) filter and can optionally include a feed-forward signal. The feed-forward signal is coupled to the bus voltage 171. The system disclosed generates a compensation signal that differs from prior art compensation signals. The modified PID' filter utilizes AC-line frequency-locked bus-voltage data which provides the advantage of being able to remove the AC-line second harmonic from the generated compensation signal 197. A half-cycle sum 180 of the bus-voltage data 121 is generated and used to generate a modified proportional signal P', from which a modified integral signal I' is generated. The summer 180 can be generated by any standard means including but not limited to inputting from the stack 140 the entire AC-line half-cycle of stack bus-voltage data 121 or by computing a running sum by subtracting the oldest stack value (Data(n−64)) which is being "pushed" out of the stack and adding the newest stack value (Data(n)). The modified P' value is used by the modified integrator 191 to generate the modified I' compensation signal component. A modified derivative value D' is generated by inputting the current bus-voltage data (Data(n)) and the half-cycle delayed bus-voltage data (Data(n−64)) into a differential generator 130 which outputs D'. The differential generator 130 can be analog or digital. The P' data is scaled by $K_P$ 192, the I' data is scaled by $K_I$ 193, and the D' data is scaled by $K_D$ 194. The scaled P', I', and D' values are input into a summing device 196 producing a composite compensation signal 197. One skilled in the art of power controller design is able to determine the scaling values of $K_P$ 192, $K_I$ 193, $K_D$ 194 to provide a desired response of the PID' filter. Additionally, the compensation signal can include a feed-forward signal $V_{feedfwd}$ scaled by $K_F$ 195. The scaled feed-forward signal can also be input into the summer 196 forming a component of the compensation signal 197. The compensation signal 197 can be input into an optional converter 160 that converts the compensation signal into a signal compatible with a power converter controller 200. The converter 160 can convert a digital target bus-voltage compensation signal into an analog signal. The compensation signal 197 provides a scaled fast response control signal for the power converter controller 200 that responds to a change in the bus voltage 171. Furthermore, the compensation signal 197 is substantially free of AC 100/120 Hz line-ripple and accordingly, the power converter 201 bus voltage has better transient response characteristics by not responding to this ripple.

The dashed line within the block diagram represents the components that are preferably implemented in a single integrated circuit such as an ASIC (application specific integrated circuit). The filter components of the PLL typically are not included in an ASIC because of the components size.

Figure 2:
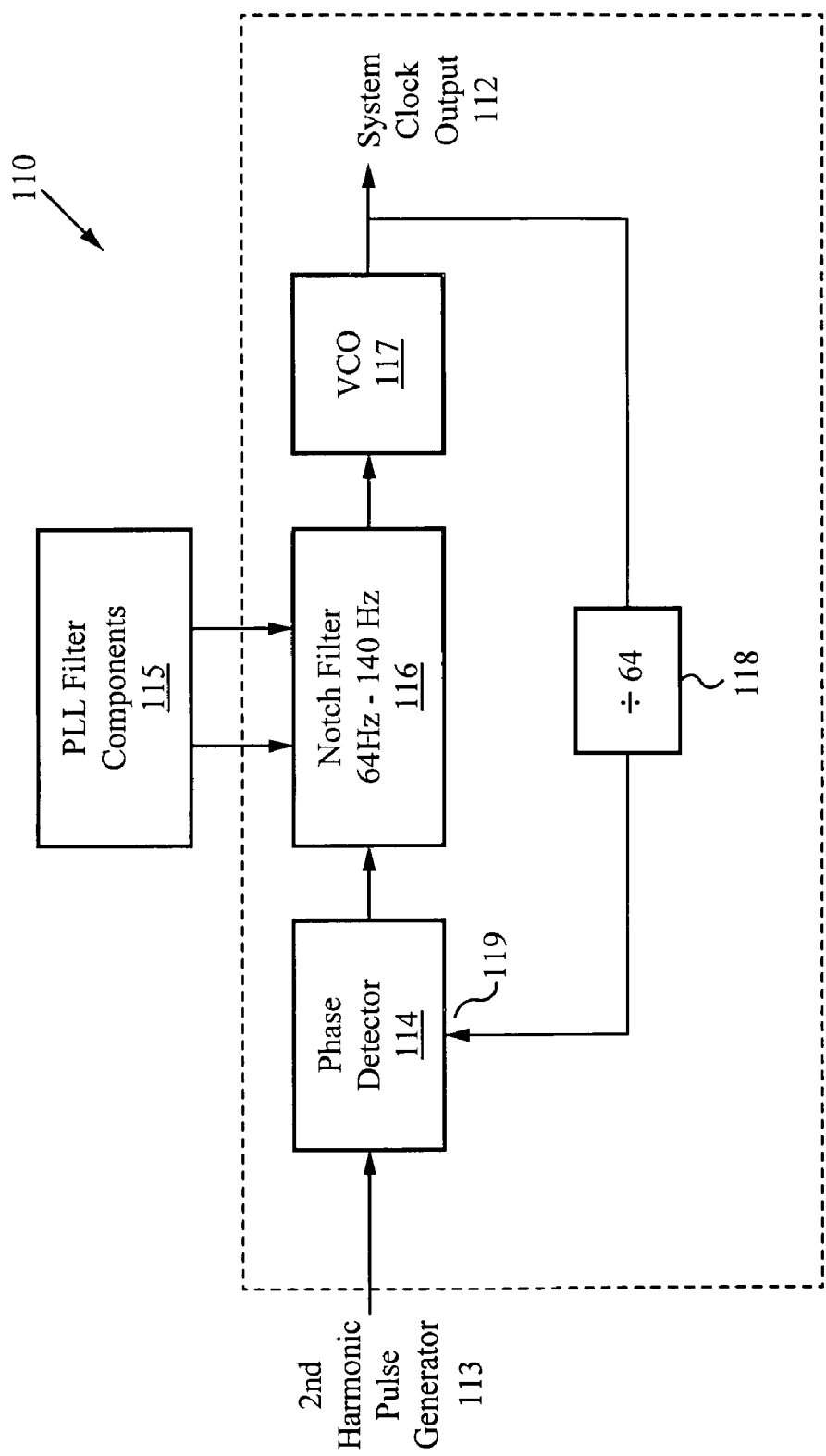
FIG. 2 illustrates one embodiment of the block diagram of the PLL of FIG. 1.

FIG. 2 illustrates a block diagram of the PLL 110 of FIG. 1 including the filter components. The PLL clock generation circuit comprises a phase detector 114, notch filter components 115, a notch filter 116, a VCO (voltage controlled oscillator) 117, and clock divider 118. The input to the PLL circuit 110 is a second harmonic input at twice the AC-line frequency. The phase detector 114 generates an output signal based on the phase differences between the second harmonic pulses 113 and the output of the frequency divider 118. The output of the phase detector 114 is input into a notch filter 116 with a pass-band between 64 Hz and 140 Hz. The filter components 115 are coupled to the notch filter 116. The output of the notch filter 116 is coupled to a VCO 117. The output of the VCO 117 is a frequency-locked system clock 112. The frequency-locked system clock output 112 is coupled to the frequency divider 118. The dashed line represents the components that can be formed within the single integrated circuit. In the present illustration, the VCO has a frequency that is 64 times the output from the second-harmonic generator, or 128 times the AC-line frequency. The frequency divider 118 divides the VCO 117 clock frequency down to a frequency equal to the output from the second-harmonic generator. The notch filter 116 constrains the PLL 110 to only respond over a narrow frequency band corresponding to the expected range of AC line frequency.

In operation, the PLL 110 shifts the VCO clock frequency so that the system clock 112 is frequency locked with the AC line-frequency and thus is frequency locked with the ripple components on the bus voltage 171. The PLL 110 provides a system clock output 112.

Figure 8:
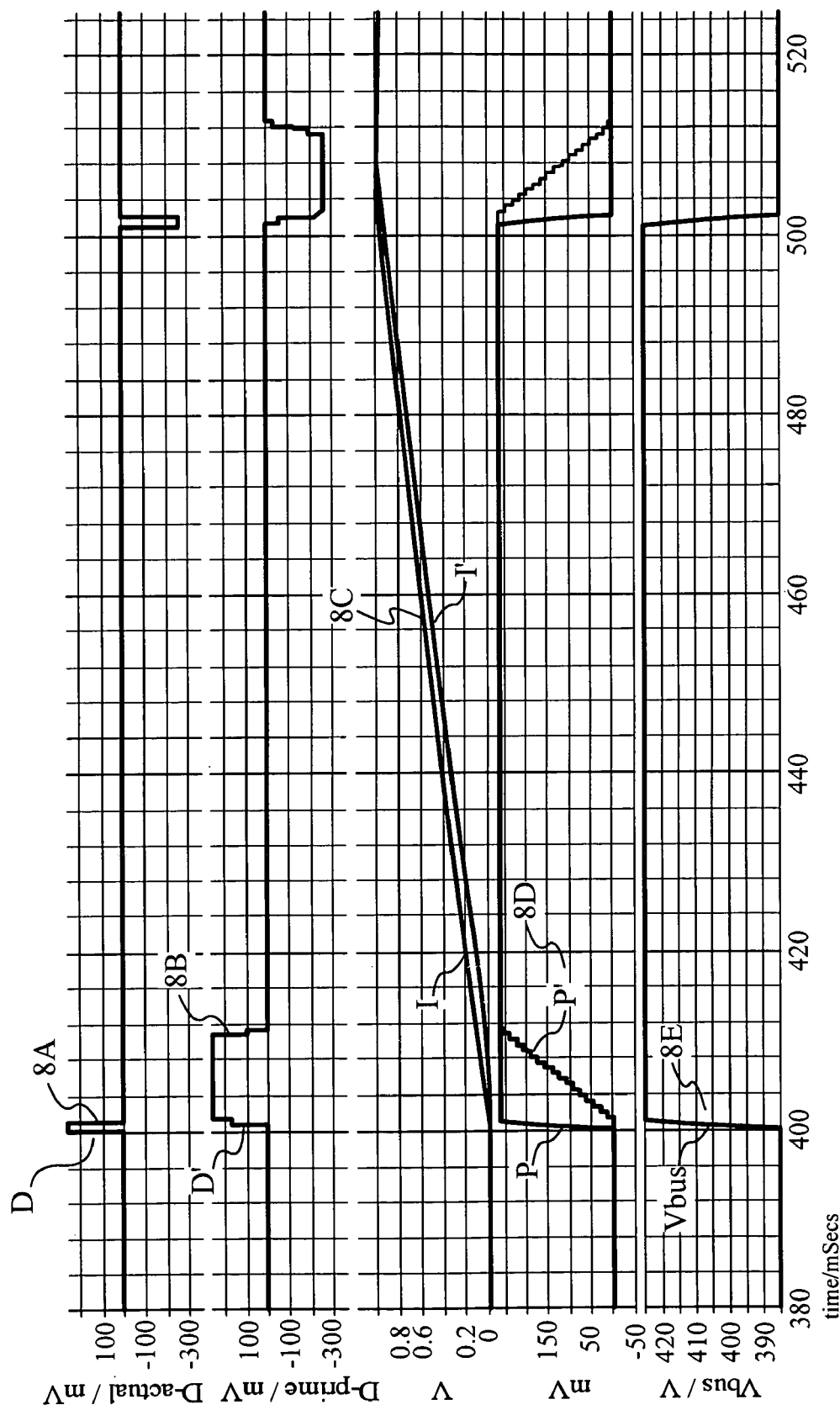
FIG. 8 shows graphs illustrating the differences in signals between a standard PID filter and a modified PID' filter in response to an input change.
Figure 9:
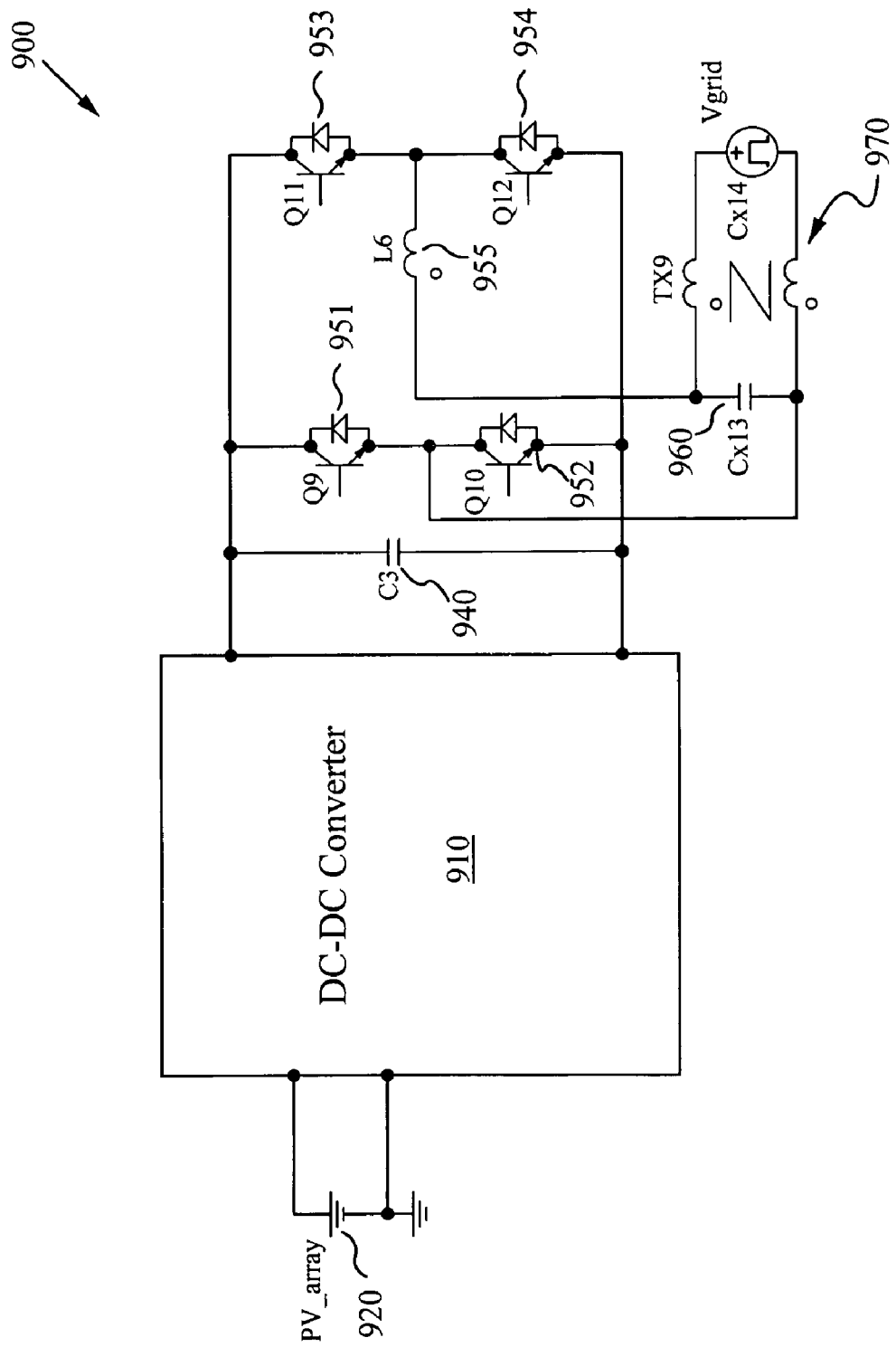
FIG. 9 illustrates a block diagram of a prior-art photovoltaic grid-tied inverter.

FIG. 8 illustrates the difference in signals between a true PID (proportional, integral, derivative) controller and the signals generated by the present invention PID' controller for an input ac line at 50 Hz. Waveform 8E (Vbus) in FIG. 8E shows a bus voltage experiencing a positive and negative step. From left to right: Vbus starts at 385V. At t=400 ms, Vbus rises to 425V in 1 ms. Vbus then remains at 425V until t=501 ms. At t=501 ms, Vbus decreases to 385V in 1 ms. The Vbus excursions do not represent any particular closed-loop converter operation. To illustrate the difference between a PID and a PID' signal, 100 Hz ripple is not included on the Vbus signal in FIG. 8E. If one uses a true PID controller on a ripple free bus, then the proportional signal P follows the waveform of Vbus. Note, in waveform 8D that P' lags behind P because the entire register stack requires filling with the higher-voltage values of Vbus in order for the stack average to have equivalence to the true proportional signal P, and it takes 10 ms (a half-cycle for a converter operating at 50 Hz) for the register stack to fill with error signals corresponding to the new Vbus value. The stack and summer, driven by a frequency locked clock, are required to remove the second harmonic ripple and thus provide a modified response PID' filter. The stair step transient response of P' is a result of discrete changes to the register stack values.

The waveform 8A shows at time 400 ms the derivative response "D" to a step wise increase in the bus voltage and at about time 500 ms the step decrease in bus voltage. Waveform 8B shows the effect on D', the modified derivative response signal, to a step increase in bus voltage of the present invention. The derivative signals D and D' have similar fast responses to the onset of the transients; however, whereas D decreases to 0 volts immediately corresponding to the end of the Vbus transient, D' does not decrease to zero until 10 ms (a half-cycle for a converter operating at 50 Hz) following the onset of the transient.

The waveform 8C shows the modified integral signal I' The modified integral signal I' is similar to the true integral signal I with a slight delay of about 4 ms. The delay is caused by a difference between the area under P' and the area under P at the transients.

One can see that the modified PID' signals depart from the true PID signals; however, one can also see that the transient information shows up in P', I', and D' immediately following the onset of the transient. In practice, one can make a PID' controller using the modified signals P', I', and D'. The response using the modified control signals is different from that of a control implemented with true PID signals, but the results are adequate to implement a fast responding and stable control with the modified signals.

Figure 6:
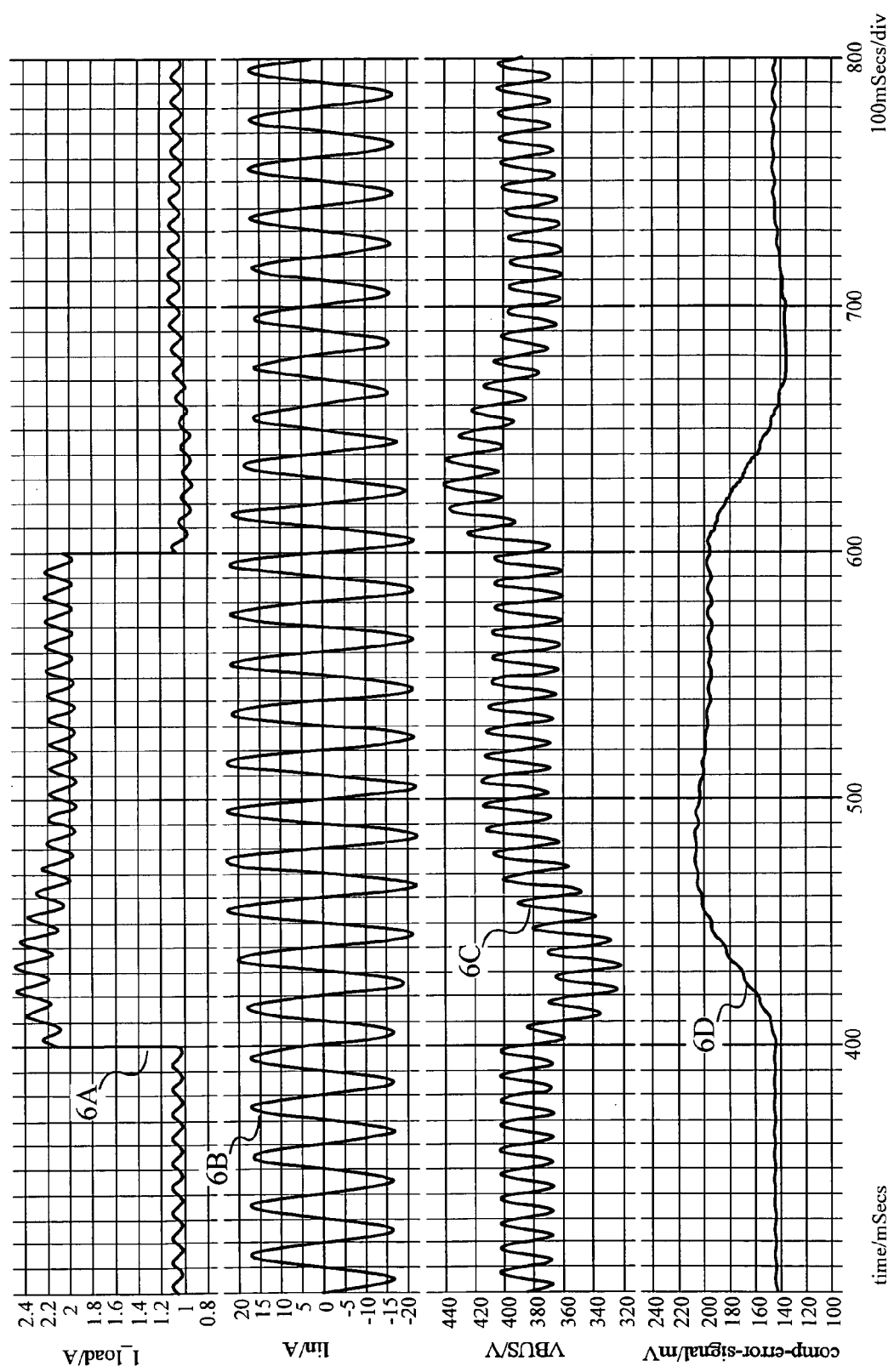
FIG. 6 shows graphs of the bus-voltage, input current, and compensation signal in response to transient load changes for a prior art system.
Figure 7:
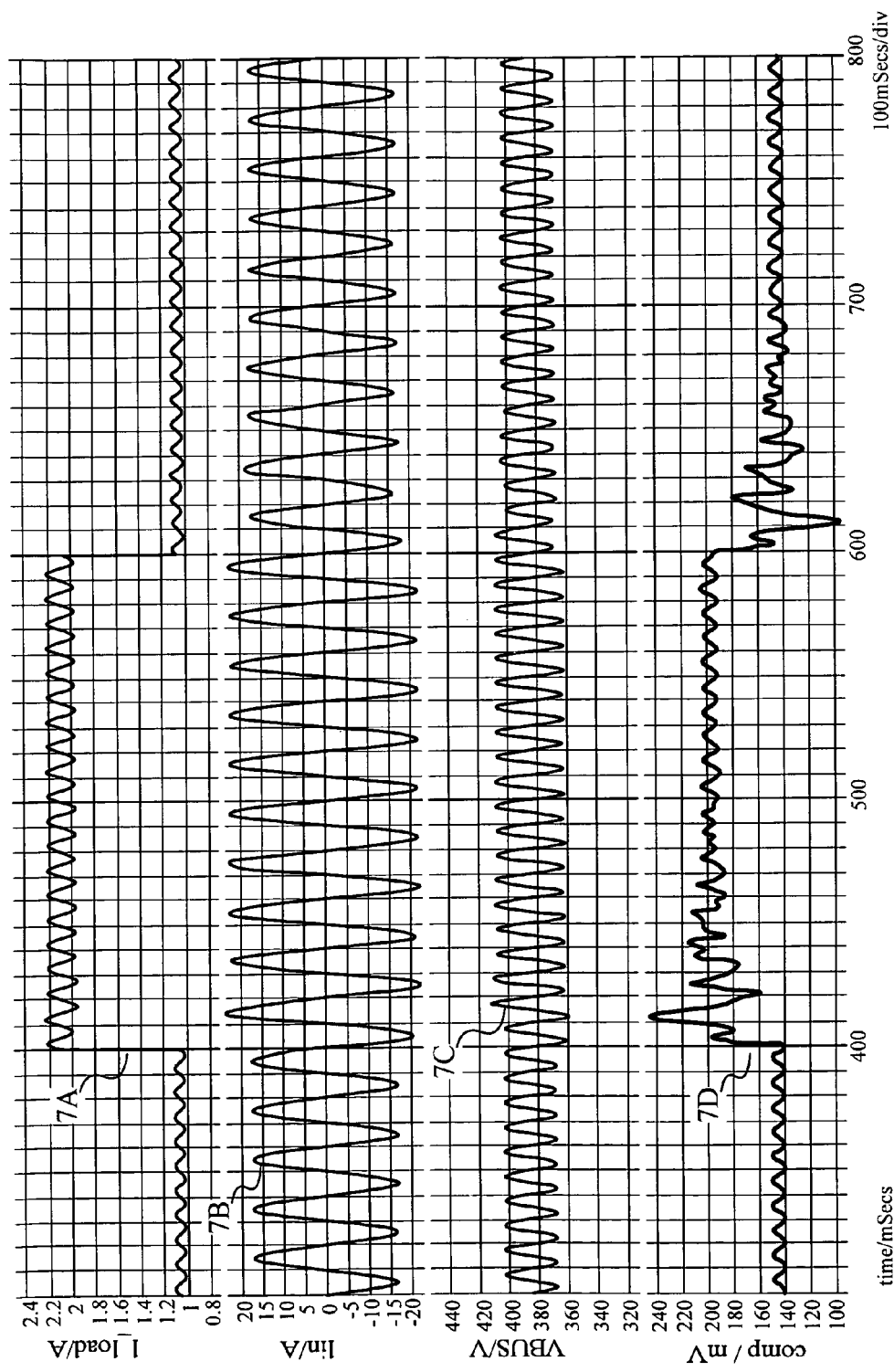
FIG. 7 shows graphs of the bus-voltage, input current, and compensation signal in response to transient load changes for a system with a fast-loop response compensation signal.

FIG. 7 illustrates the benefits of a power converter utilizing a compensation signal generated from the voltage bus data that has had the second harmonic ripple removed in the generation of a compensation signal. The waveform 7A shows a step increase in the load. The load increase occurs at time 400 ms and decreases at 600 ms. Waveform 7B shows the corresponding AC current draw. As expected, the AC current draw increases between 400 ms and 600 ms to meet the increased load. There is a slight overshoot in the current draw as the converter quickly responds to the transient. Waveform 7C shows the bus voltage out of the power converter with a target bus-voltage compensation signal of the present invention. Note the small change in the bus voltage as compared to the prior-art of FIG. 6. The bus voltage deviates from its steady-state value by only about 2V, compared to a 50V deviation seen in the prior-art waveform 6C of FIG. 6. The waveform 7D represents the compensation signal waveform generated by the present invention. One can see that the compensation waveform shows a very fast response to the transient, as compared with the prior-art waveform 6D of FIG. 6.

Figure 3:
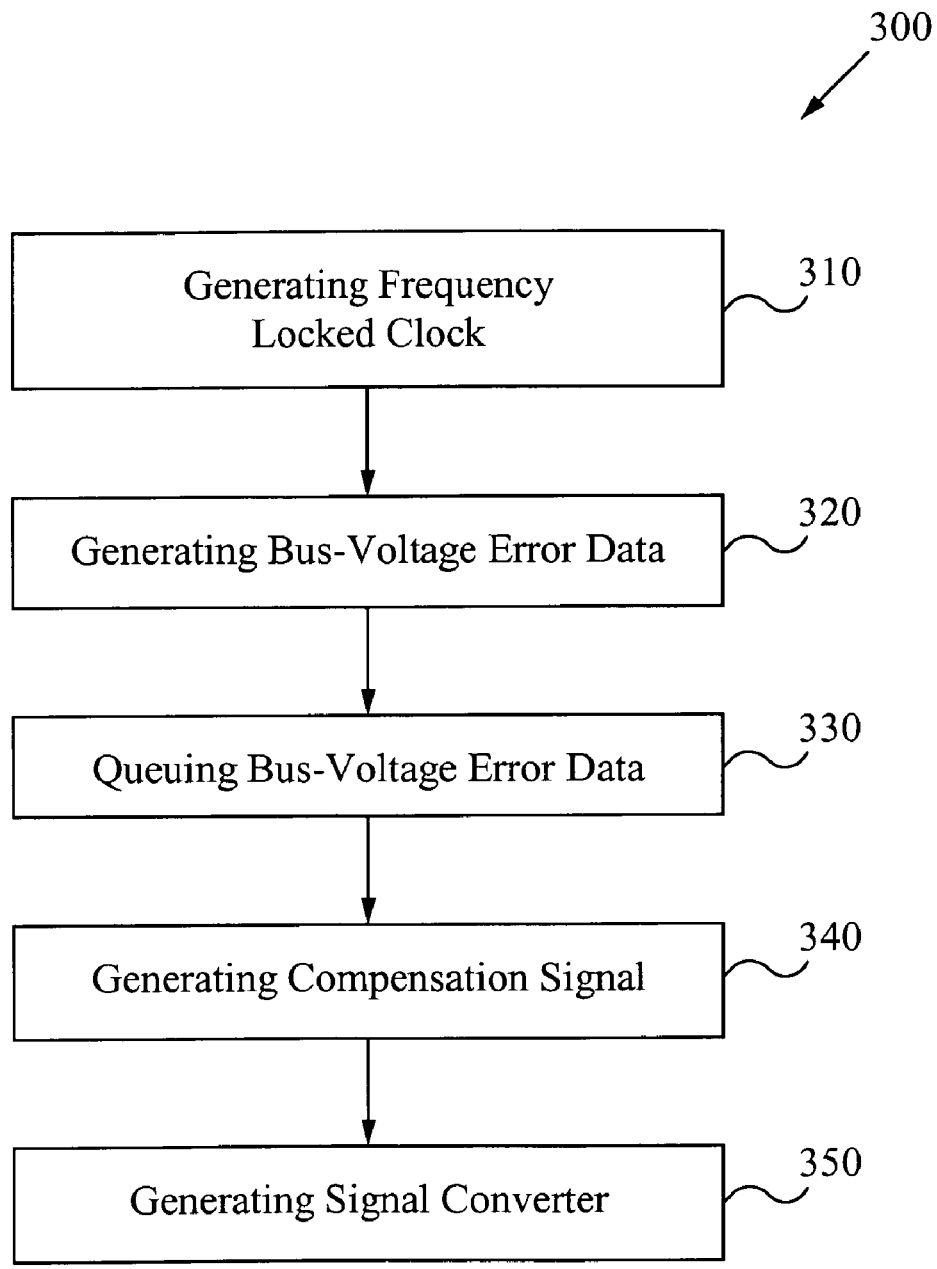
FIG. 3 illustrates the method to generate a compensation signal substantially free of second harmonic AC-line frequency ripple from a power converter bus voltage having a second harmonic AC line-frequency ripple.

FIG. 3 illustrates a flow chart 300 of the method of generating a compensation signal, either digital or analog, for a power converter where the compensation signal is substantially free of the 100/120 Hz line-frequency ripple. In the step 310, a frequency-locked system clock is generated that is phased locked to an AC line-frequency. The system clock can be generated by a number of means including a PLL comprising analog components, digital components, or a combination thereof. The AC line frequency, to which the PLL locks, can be designed to only lock to frequencies of between 64 Hz to 140 Hz. Limiting the frequency range to which the PLL will lock reduces the possibility of accidental locking to a frequency other than the 100/120 Hz second harmonic AC line-frequency ripple. The frequency-locked system clock is provided to the rest of the system for synchronous bus-voltage data generation, queuing the data, and forming the compensation signal. The generation of the frequency-locked system clock can be implemented with discrete components or can be an integrated component. Further, the frequency-locked system clock can be part of a larger system integrated circuit.

In the step 320, bus-voltage data is generated at a frequency-locked system clock rate. Digital samples can be generated by an A/D (analog-to-digital) converter and can be buffered. Any A/D converter can be used for generating bus-voltage data so long as the converter can take samples at the desired system clock rate. The resolution (number of bits) of the samples can be selected to provide sufficient sensitivity to process the AC line ripple that is riding on top of the bus voltage. The fewer bits of resolution the A/D has, the more quantization noise in the bus samples and the less sensitivity in generating a control signal that does not contain AC ripple components. Further, the larger the bus voltage, the greater the range needed by the A/D. An A/D with 12-bits of resolution provides a 400V bus with approximately 100 mV resolution, but provides a bus-voltage of 80V with approximately 20 mV resolution. A 10-bit A/D provides substantially the same resolution for a system with a 100V bus voltage or 20V error range. Thus, the number of bits of resolution on the A/D can be selected to match the minimum desired level AC-ripple on the control signal. The buffered samples are output for queuing. If bus-voltage data is queued in an analog form, then the bus-voltage data can be level shifted, scaled, and buffered before being input into the stack.

In the step 330, the bus-voltage data is stored in a stack. Preferably, the stack provides a way to output data delayed by the stack size and also provide an output for the latest sample value. However, other stack configurations can be used. Bus-voltage data is moved into the stack and output from the stack at a frequency-locked system clock rate. The stack is sized to provide a bus-voltage data delay of one-half cycle of the AC line between the last entered bus-voltage data value and the oldest bus-voltage data value. The stack size is equivalent to one cycle of the rectified bus input signal. A convenient stack depth is sixty-four samples but other stack sizes are within the scope of the invention. Preferable, the stack is implemented with digital technology known by one skilled in the art of digital components. Also, an analog version of the stack is contemplated. Charge coupled devices can be used to store analog bus-voltage data samples.

In the step 340 a compensation signal is generated from bus-voltage data that is substantially free from second harmonic ripple from the AC-input voltage. The ripple free data for a proportional compensation signal component and an integral signal component is generated by a summer that keeps a running sum of the stack values. Because the data in the stack is frequency locked with the AC-line voltage ripple and represents exactly one cycle of the second harmonic AC line ripple, the sum of the stack values will sum to zero. Accordingly the proportional and integral compensation signal generation components are free from second AC-line voltage harmonics. The differential compensation signal component is generated from bus-voltage data that is separated in time by one cycle of the second harmonic of the AC-line voltage. Accordingly, this differential component is free of second harmonic ripple. These three components, each scaled, form a modified PID' (proportional, integral, differential) compensation signal. The compensation signal generator can be analog or digital. Preferably the signal is digital.

In the optional step 350, the compensation signal is converted to a format compatible with the power converter controller (200-FIG. 1). If the compensation signal is digital and the power converter controller takes an analog compensation signal, the compensation signal is converted from digital to analog.

Figure 4:
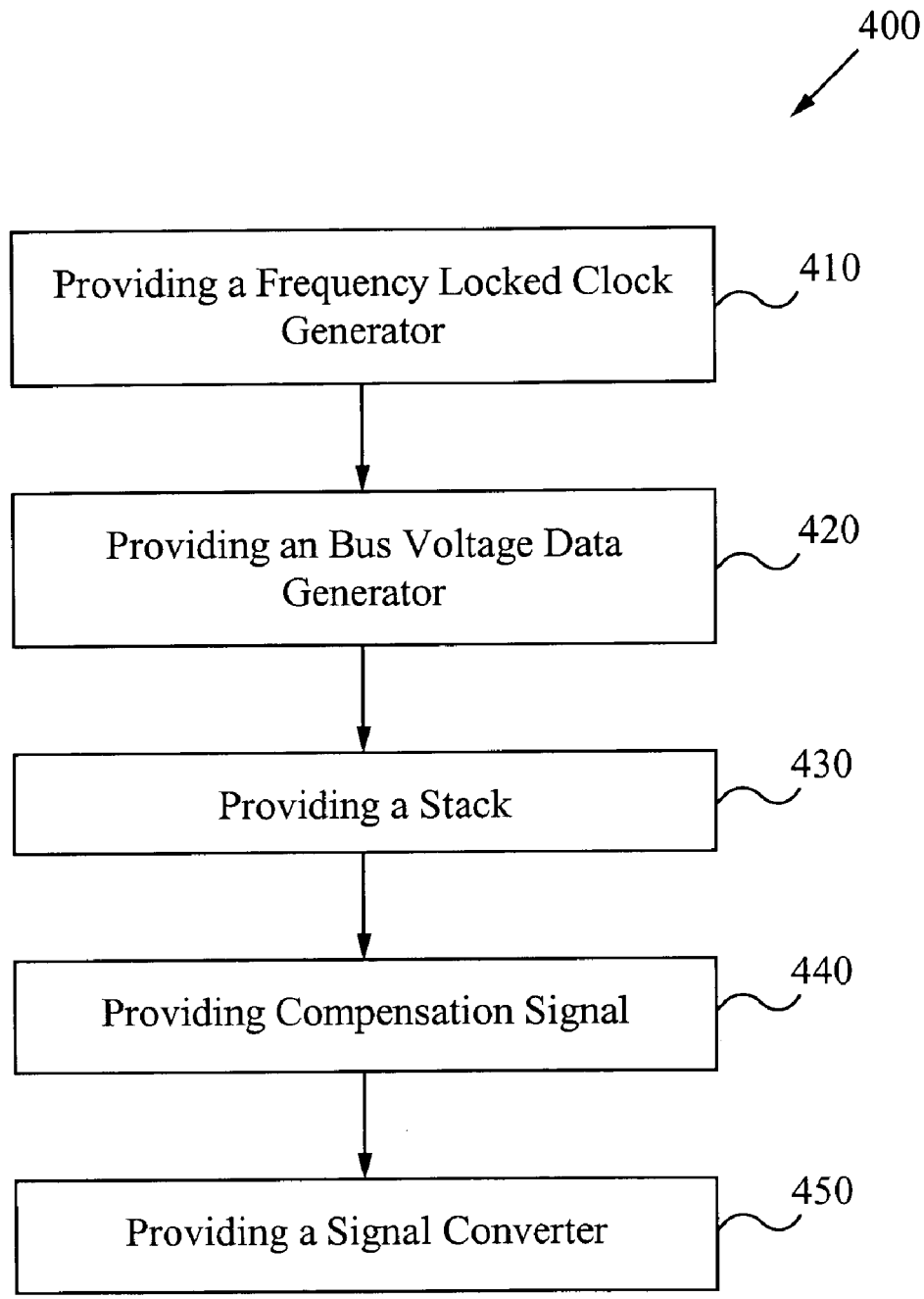
FIG. 4 illustrates the method to manufacture an apparatus to generate a fast loop response compensation signal for a power converter bus that is substantially free of second harmonic line-frequency ripple.
Figure 5:
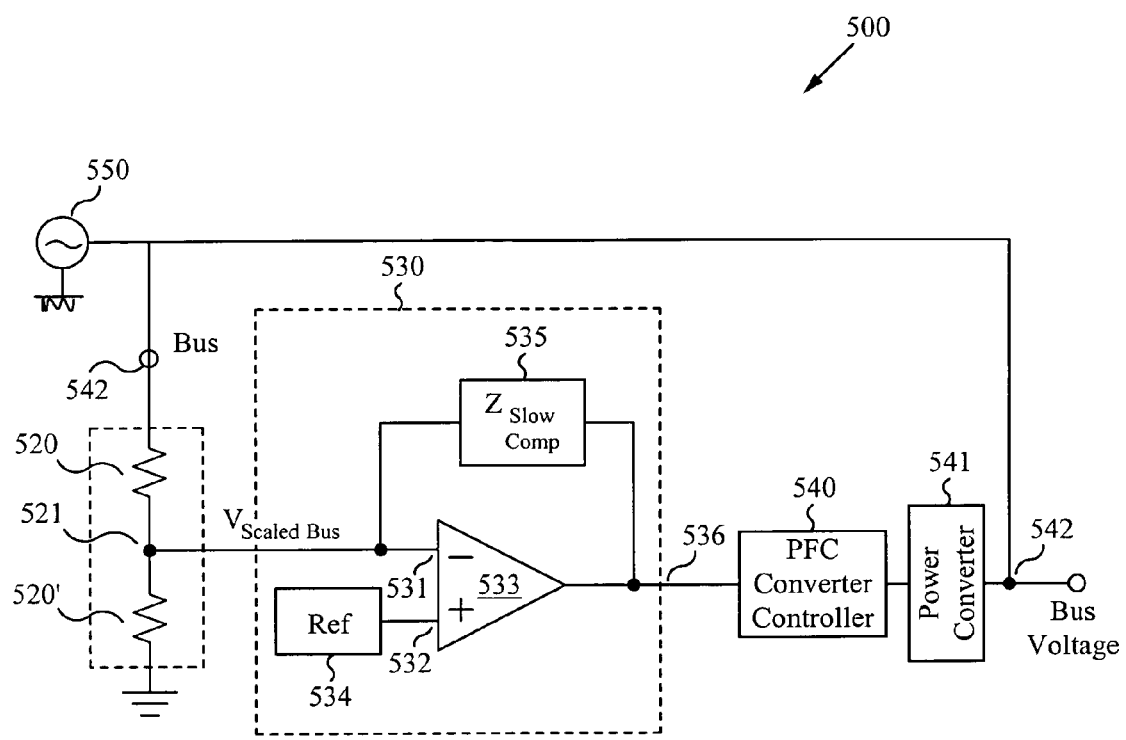
FIG. 5 illustrates the prior art for generating a slow response compensation signal for a power converter.

FIG. 4 illustrates a flow chart 400 of the method of manufacturing an apparatus for generating a compensation signal that is free of the line-frequency ripple. In the step 410, a frequency-locked system clock generator is provided that can frequency lock to an AC line frequency. The provided system clock generator can be an analog or a digital PLL. The AC line frequency, to which the provided system clock locks, can be limited to between 64 Hz to 140 Hz. The provided frequency-locked system clock generator is configured to provide a system clock for synchronous sampling, stacking, and generating compensation signals. The provided system clock can be implemented with discrete components or can be an integrated circuit. Further, the provided frequency-locked system clock can be part of a larger system ASIC which can include all or part of the power converter controller.

In the step 420, a bus-voltage data generator is provided for generation of bus-voltage samples at a synchronous system clock rate. The samples can be analog or digital. The bus-voltage input can be processed by a differential amplifier comparing it to a constant value to generate a bus-voltage error signal. The bus-voltage data can be generated by an A/D (analog-to-digital) converter and can be buffered. Any A/D converter can be used for generating samples so long as the converter can take samples at the desired system clock rate and desired resolution.

In the step 430, a stack is provided. The stack inputs and outputs bus-voltage data. The stack output can be configured in multiple ways including but not limited to a latest bus-voltage data output and a delayed bus-voltage output. The bus-voltage data in the stack can be in an analog or a digital form. Bus-voltage error data is moved into the stack and output from the stack at a frequency-locked system clock rate. The stack output can be configured to output the latest data sample and a data sample delayed by one or more complete cycles of the AC-line second harmonic. The stack is preferably sized to provide a bus sample delay of one-half cycle of the AC line, but integral multiples of the one-half cycle are also contemplated. A convenient stack depth is sixty-four samples but other stack sizes are within the scope of the invention.

In the step 440 a compensation signal generator is provided. The compensation signal generator provides a compensation signal by the methods described above for the method step 340.

In the optional step 450 a compensation signal converter is provided. The compensation signal can be digital where the power converter expects an analog signal. The signal converter provides any required conversion including but not limited to conversion from digital to analog, analog to digital, level matching, and impedance matching.

What is claimed is:
1. A device for generating a compensation signal for a power converter comprising:
  a) a frequency-locked clock, coupled to an AC-line having an AC-line voltage frequency, generating a frequency that is frequency locked to an integral multiple of the AC-line voltage frequency, wherein the frequency-locked clock is a phase-locked-loop configured to selectively lock to twice the AC-line voltage frequency;
  b) a bus-voltage sampler, operatively coupled to the frequency-locked clock and coupled to a power converter bus having a bus-voltage, generating bus-voltage data at the frequency;

c) a stack of the bus-voltage data, operatively coupled to the bus-voltage sampler, wherein the stack is structured to contain the bus-voltage data sampled from a time interval of one-half cycle of an AC-line voltage; and d) a compensation module, operatively coupled to the stack and configured to generate from the bus-voltage data a compensation signal, and wherein the compensation module is configured to produce the compensation signal in which frequency components at even multiples of AC-line voltage frequency are minimized.

2. The device of claim 1, wherein the frequency-locked clock is configured to only lock to frequencies between 64 hertz and 140 hertz.

3. The device of claim 1, wherein the stack comprises a charged coupled array.

4. The device of claim 1, wherein the compensation module comprises:
a means for summing the bus-voltage data wherein the bus-voltage data was sampled over a time period of one or more complete half-cycles of the AC-line voltage coupled to the stack producing a summer output;
a computational module comprising one or more of:
a scaled proportional component coupled to the summer output having a scaled proportional output;
a scaled integral component coupled to the summer output having a scaled integral output; and
a scaled derivative component coupled to the stack and configured to process two bus-voltage data samples separated by a second time period of one or more complete half-cycles of the AC-line voltage having a scaled proportional output; and
a PID summer configured to sum the scaled proportional output, the scaled integral output, and the scaled derivative output, forming a compensation signal.

5. The device of claim 4, wherein the compensation module further comprises a scaled feed-forward component having an input coupled to the power converter bus, having a feed-forward output coupled to the PID summer, wherein the compensation signal further comprises a scaled feed-forward signal component.

6. The device of claim 4, wherein the compensation signal module implements computation digitally.

7. The device of claim 6, further comprising a converter module having a converter input configured to receive the compensation signal, wherein the converter input is digital, and wherein the converter converts the digital compensation signal to an analog compensation signal provided on a converter output.

8. The device of claim 7, further comprising a power converter controller configured to receive the converter's analog output.

9. The device of claim 4, wherein the compensation signal module processes signals with analog components and has an analog compensation signal output.

10. The device of claim 9, further comprising a power converter controller having a compensation signal input, configured to receive an analog compensation signal and coupled to a converter module.

11. The device of claim 1, wherein the bus-voltage sampler generates data-samples that represent a scaled difference between a target-voltage and the bus-voltage.

12. The device of claim 1, wherein the bus-voltage sampler generates analog bus-voltage data and the stack uses analog charged coupled devices to store the analog bus-voltage data.

13. The device of claim 1, wherein the bus-voltage sampler generates digital bus-voltage data and the stack stores the digital bus-voltage data.

14. The device of claim 1, wherein the device is implemented in an ASIC, and wherein the phase-locked-loop comprises phase-locked-loop filter components that can be external to the ASIC.

15. The device of claim 14, further comprising a power converter controller as part of the ASIC.

16. A method of generating a compensation signal for a power converter comprising the steps:
a) generating a frequency-locked clock having a frequency that is locked to an integral multiple of an AC-line voltage frequency, wherein the frequency-locked clock is a phase-locked-loop configured to selectively lock to twice the AC-line voltage frequency;
b) generating bus-voltage data at the frequency, from a power converter bus-voltage;
c) queuing the bus-voltage data, wherein a stack is structured to contain the bus-voltage data spanning a time interval of one-half cycle of an AC-line voltage; and
d) compensating the bus-voltage data and forming a compensation signal, wherein the compensating minimizes frequency components in the compensation signal that are at even multiples of the AC-line voltage frequency.

17. The method of claim 16, wherein the frequency-locked clock is configured to only lock to frequencies between 64 hertz and 140 hertz.

18. The method of claim 16, wherein the queuing is within an analog delay line, and wherein the queuing is for one or more half-cycles of the AC-line voltage.

19. The method of claim 16, wherein the compensating forms the compensation signal comprising at least one of a scaled derivative component signal, a scaled proportional component signal, and a scaled integral component signal from the bus-voltage data.

20. The method of claim 19, wherein the compensating further comprises a scaled feed-forward component signal in forming the compensation signal.

21. The method of claim 16, wherein the compensation signal is digital.

22. The method of claim 21, further comprising converting the compensation signal to an analog signal.

23. The method of claim 16, wherein the compensation signal is analog.

24. The method of claim 16, wherein the generating of a bus-voltage data represents a scaled difference between a target-voltage and the bus-voltage.

25. The method of claim 16, wherein the generation of bus-voltage data is analog, and the queuing bus-voltage data uses analog charged coupled devices to store data-samples.

26. The method of claim 16, wherein the generating bus-voltage data provides digital bus-voltage data and the queuing uses a digital stack.

27. The method of claim 16, further comprising the step of power factor correction.

28. A method of manufacturing a device for generating a compensation signal for a power converter, comprising the steps:
a) providing a frequency-locked clock coupled to an AC-line having an AC-line voltage frequency, wherein the clock is configured to generate a frequency that is frequency locked to an integral multiple of the AC-line voltage frequency, wherein the frequency-locked clock is a phase-locked-loop configured to selectively lock to twice the AC-line voltage frequency;
b) providing a bus-voltage sampler coupled to the frequency-locked clock and coupled to a power converter bus having a bus-voltage and generating bus-voltage data at the frequency;

c) providing a stack coupled to the bus-voltage sampler, wherein the stack is structured to contain bus data-samples spanning a time interval of one-half cycle of an AC-line voltage; and d) providing a compensation module, operatively coupled to the stack, and configured to generate from the bus-voltage data a compensation signal, and wherein the compensation signal module is configured to produce the compensation signal in which frequency components at even multiples of the AC-line voltage frequency are minimized.

29. The method of manufacturing of claim 28, wherein the frequency-locked clock is configured to only lock to frequencies between 64 hertz and 140 hertz.

30. The method of manufacturing of claim 28, wherein the stack comprises a charged coupled array.

31. The method of manufacturing of claim 28, wherein the compensation module comprises:
a means for summing the bus-voltage data sampled over one or more complete half cycles of the AC-line voltage coupled to the stack producing a summer output,
a computational module comprising one or more of:
  a scaled proportional component coupled to the summer output having a scaled proportional output;
  a scaled integral component coupled to the summer output having a scaled integral output; and
  a scaled derivative component coupled to the stack and configured to process two bus-voltage data samples separated by the one or more complete half cycles of the AC-line voltage having a scaled proportional output; and
a PID summer configured to sum the scaled proportional output, the scaled integral output, and the scaled derivative output, forming a compensation signal.

32. The method of manufacturing of claim 31, with a scaled feed-forward component coupled to a feed-forward signal, wherein the compensation signal further comprises a scaled feed-forward component signal.

33. A device for generating a compensation signal for a power converter comprising:
a) a frequency-locked clock, coupled to an AC-line having an AC-line voltage frequency, generating a frequency that is frequency locked to an integral multiple of the AC-line voltage frequency;
b) a bus-voltage sampler, operatively coupled to the frequency-locked clock and coupled to a power converter bus having a bus-voltage, generating bus-voltage data at the frequency and data-samples that represent a scaled difference between a target-voltage and the bus-voltage;
c) a stack of the bus-voltage data, operatively coupled to the bus-voltage sampler, wherein the stack is structured to contain the bus-voltage data sampled from a time interval of one-half cycle of an AC-line voltage; and
d) a compensation module, operatively coupled to the stack and configured to generate from the bus-voltage data a compensation signal, and wherein the compensation module is configured to produce the compensation signal in which the frequency components at even multiples of AC-line voltage frequency are minimized.

34. A method of generating a compensation signal for a power converter comprising the steps:
a) generating a frequency-locked clock having a frequency that is locked to an integral multiple of an AC-line voltage frequency;
b) generating bus-voltage data at the frequency, from a power converter bus-voltage, wherein the bus-voltage data represents a scaled difference between a target-voltage and the bus-voltage;
c) queuing the bus-voltage data, wherein a stack is structured to contain the bus-voltage data spanning a time interval of one-half cycle of an AC-line voltage; and
d) compensating the bus-voltage data and forming a compensation signal, wherein the compensating minimizes frequency components in the compensation signal that are at even multiples of the AC-line voltage frequency.

* * * * *